(12) United States Patent
Kou

(10) Patent No.: US 6,868,460 B1
(45) Date of Patent: Mar. 15, 2005

(54) APPARATUS FOR CD WITH INDEPENDENT AUDIO FUNCTIONALITY

(75) Inventor: Wallace C. Kou, Los Altos, CA (US)

(73) Assignee: Silicon Motion, Inc., San Jose, CA (US)

(*) Notice: Subject to any disclaimer, the term of this patent is extended or adjusted under 35 U.S.C. 154(b) by 168 days.

(21) Appl. No.: 10/163,541

(22) Filed: Jun. 5, 2002

Related U.S. Application Data
(60) Provisional application No. 60/296,383, filed on Jun. 5, 2001.

(51) Int. Cl.⁷ ................................................. G06F 3/00
(52) U.S. Cl. ......................... 710/36; 710/5; 710/14; 710/33; 711/200; 712/405
(58) Field of Search ........................ 710/5, 14, 33, 710/36, 2; 711/200; 712/405

(56) References Cited

U.S. PATENT DOCUMENTS

| | | | |
|---|---|---|---|
| 4,802,152 A * | 1/1989 | Markvoort et al. ...... 369/30.22 |
| 5,548,777 A | 8/1996 | Woo |
| 5,572,685 A | 11/1996 | Fisher et al. |
| 5,740,378 A | 4/1998 | Rehl et al. |
| 5,758,101 A | 5/1998 | Pemberton |
| 5,796,705 A | 8/1998 | Kim |
| 5,805,921 A * | 9/1998 | Kikinis et al. ................ 710/2 |
| 5,832,282 A | 11/1998 | Pate et al. |
| 5,838,983 A | 11/1998 | Atkinson |
| 5,870,355 A | 2/1999 | Fujihara |
| 5,910,933 A | 6/1999 | Moore |
| 5,938,783 A | 8/1999 | Whetsel |
| 5,964,848 A * | 10/1999 | Kikinis et al. ................ 710/2 |
| 5,968,141 A * | 10/1999 | Tsai ........................... 710/14 |
| 6,006,285 A | 12/1999 | Jacobs et al. |
| 6,006,337 A | 12/1999 | Koo |
| 6,076,133 A | 6/2000 | Brainard et al. |
| 6,088,422 A * | 7/2000 | Mann ......................... 377/73 |
| 6,088,809 A | 7/2000 | Atkinson |
| 6,195,713 B1 | 2/2001 | Chaiken et al. |
| 6,226,237 B1 | 5/2001 | Chan et al. |
| 6,253,281 B1 * | 6/2001 | Hall ........................... 711/112 |
| 6,266,714 B1 | 7/2001 | Jacobs et al. |
| 6,378,077 B1 | 4/2002 | Atkinson |
| 6,385,734 B2 | 5/2002 | Atkinson |
| 6,393,499 B1 | 5/2002 | Chaiken et al. |
| 2002/0052990 A1 | 5/2002 | Chan et al. |
| 2002/0116552 A2 * | 8/2002 | Verinsky et al. ............. 710/5 |

FOREIGN PATENT DOCUMENTS

| | | |
|---|---|---|
| WO | WO 01/15159 | 3/2001 |
| WO | WO 01/61442 | 8/2001 |
| WO | WO 03/083694 | 10/2003 |

OTHER PUBLICATIONS

PJRC, "Using an IDE Hard Drive with a 8051 Board and 82C55 Chip", http://www.pjrc.com/tech/8051/ide/, Dec. 1999.*

* cited by examiner

Primary Examiner—Fritz Fleming
Assistant Examiner—Angel L. Casiano
(74) Attorney, Agent, or Firm—Blakely, Sokoloff, Taylor & Zafman LLP (57) ABSTRACT

An apparatus for a compact disk with an independent audio functionality is disclosed. The apparatus includes a logic core, an IDE controller, and a pass-through module, which are coupled to a micro-controller core. The logic core receives and sends signals to and from a system interface in response to the micro-controller core. The logic core disables sending signals to the system interface in response to the micro-controller core. The IDE controller core receives and sends signals to and from a CD drive interface in response to the micro-controller core. The IDE controller core also disables sending signals to the CD drive interface in response to the micro-controller core. The pass-through module is coupled to the system interface and to the CD drive interface. The pass-through module passes signals between the system interface and the CD drive interface when the computer is in power on mode.

15 Claims, 9 Drawing Sheets

BlueBirdVL Notebook Implementation

BlueBirdVL Notebook Implementation

APPARATUS FOR CD WITH INDEPENDENT AUDIO FUNCTIONALITY

CLAIM OF PRIORITY

This application claims priority to U.S. Provisional Patent Application No. 60/296,383, filed on Jun. 5, 2001, entitled "METHOD AND APPARATUS FOR CD-ROM WITH INDEPENDENT AUDIO FUNCTIONALITY" and which names the same inventor as the present application.

BACKGROUND OF THE INVENTION

1. Field of the Invention

The invention generally relates to Compact Disk (CD) devices and more specifically relates to CD drives for use in both computer-related and independent operations.

2. Description of the Related Art

While CD drives have been a popular part of computers for years, the technology has not kept up with the proliferation of new formats for audio files. MP3 files of audio such as song or voice tracks have grown in popularity. However, MP3 and other protocols for encoding music or other audio information require processing beyond what the typical CD drive can perform. Most CD drives can process only CD-DA format audio information independently, and rely on a general purpose processor in a computer to process other formats. At the same time, these popular formats are desirable to consumers, both due to availability of audio tracks in these formats, and increased storage density.

SUMMARY OF THE INVENTION

The present invention is described by way of example and not limitation in the following summary. It will be appreciated that various embodiments may include features which are not necessary to fulfill the spirit and scope of the present invention. A method and apparatus for cd (compact disc) with independent audio functionality is described.

In one embodiment, the invention is an apparatus. The apparatus includes a micro-controller core. The apparatus also includes a first logic core coupled to the micro-controller core; the first logic core to receive and send signals to and from a system interface responsive to the micro-controller core; and the first logic core to disable sending signals to the system interface responsive to the micro-controller core. The apparatus also includes an IDE controller core coupled to the micro-controller core; the IDE controller core to receive and send signals to and from a CD (compact disc) drive interface responsive to the micro-controller core; and the IDE controller core to disable sending signals to the CD drive interface responsive to the micro-controller core. The apparatus also includes a pass-through module, the pass through-module coupled to the system interface and to the CD drive interface; the pass-through module also coupled to the micro-controller core; the pass-through module to pass signals between the system interface and the CD drive interface responsive to the micro-controller core.

In an alternate embodiment, the invention is a method. The method includes controlling a compact disc (CD) drive. The method also includes receiving a processor interrupt. The method further includes directly channeling signals from a processor originating the interrupt to the CD drive. The method also includes resuming control of the CD drive.

In another embodiment, the invention is an apparatus. The apparatus is an integrated circuit configured to receive signals from a system and from a CD (compact disc) drive. The integrated circuit is configured to operate in a first mode and a second mode. The first mode includes passing signals directly from the system to the CD drive and passing signals directly from the CD drive to the system. The second mode includes controlling the CD drive without passing signals from the system to the CD drive.

BRIEF DESCRIPTION OF THE DRAWINGS

The present invention is illustrated by way of example and not limitation in the accompanying figures.

DETAILED DESCRIPTION

A method and apparatus for cd (compact disc) with independent audio functionality is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is an apparatus. The apparatus includes a microcontroller core. The apparatus also includes a first logic core coupled to the micro-controller core; the first logic core to receive and send signals to and from a system interface responsive to the micro-controller core; and the first logic core to disable sending signals to the system interface responsive to the micro-controller core. The apparatus also includes an IDE controller core coupled to the micro-controller core; the IDE controller core to receive and send signals to and from a CD (compact disc) drive interface responsive to the micro-controller core; and the IDE controller core to disable sending signals to the CD drive interface responsive to the micro-controller core. The apparatus also includes a pass-through module, the pass through-module coupled to the system interface and to the CD drive interface; the pass-through module also coupled to the micro-controller core;

the pass-through module to pass signals between the system interface and the CD drive interface responsive to the micro-controller core.

In an alternate embodiment, the invention is a method. The method includes controlling a compact disc (CD) drive. The method also includes receiving a processor interrupt. The method further includes directly channeling signals from a processor originating the interrupt to the CD drive. The method also includes resuming control of the CD drive.

In another embodiment, the invention is an apparatus. The apparatus is an integrated circuit configured to receive signals from a system and from a CD (compact disc) drive. The integrated circuit is configured to operate in a first mode and a second mode. The first mode includes passing signals directly from the system to the CD drive and passing signals directly from the CD drive to the system. The second mode includes controlling the CD drive without passing signals from the system to the CD drive.

In yet another embodiment, the invention provides a method and apparatus suitable for enhancing a CD-ROM device, such as a CD-RW (Rewritable CD) or similar device (similar devices may include CD-R, DVD drives, and potentially magnetic drives) without radically changing established (and reliable) architectures for these drives. In one embodiment, the apparatus is a device such as an integrated circuit interposed between a traditional CD-RW controller and a system interface such as an IDE, USB, or other communications bus. The integrated circuit thus interposed allows for play of MP3 or similar files accessed through the CD-RW module when a connected device such as a laptop computer is off (not at full power) or when the connected device is not accessing the CD-RW device. Preferably, when the connected device is accessing the CD-RW device, the integrated circuit should appear transparent to each of the connected device and the traditional CD-RW controller.

While much of the following discussion focuses on MP3 formatted files, it will be appreciated that the present invention may be used for purposes of playing audio tracks in other formats which require processing beyond that typically performed by a CD drive controller. As such, use of the MP3 format should be regarded as exemplary, rather than limiting, and it should be recognized that many other formats, among them ACC for example, may be used within the spirit and scope of the present invention.

Various embodiments of the present invention provide numerous advantages, although it will be appreciated that only some embodiments may provide certain advantages while other embodiments may provide other advantages. In one embodiment, an integrated circuit added to a well-known CD-RW implementation allows for playing MP3 audio files from the CD-RW. The device disconnects the IDE bus from the host chip set and access the CD-RW on that IDE bus directly. The device isolates the CD-RW from the Host port and accesses the CD-RW for MP3 files. The CDROM directory will be traversed and a play list of MP3 files will be built in an alphabetical sequence. Normal audio CD (CD-DA format) is also supported. In this case the playback is by track number as a regular audio CD.

In an alternate embodiment, a user may listen to MP3 files from a CD-RW while the PC containing the device or the PC working with the device is in a power off mode, or a mode similar to a sleep or suspend mode. It provides much longer hours of operation than if it were using the main processor, potentially more than five times the play time of a typical system.

In yet another embodiment, a user may write files to a CD-RW while the PC containing the device or the PC working with the device is in a power off mode, or a mode similar to a sleep or suspend mode. This may also provide much longer hours of operation than if it were using the main processor, potentially more than five times the play time of a typical system.

In still another embodiment, an integrated circuit added to a well-known CD-RW implementation may appear transparent when the system is on. When the system is in on mode, the IDE bus is controlled by the host chip set and the device is completely transparent to the system. However, the keypad controls (associated with the integrated circuit) are functional in order to provide notebook users ease of control while listening to music when the notebook is on. Key pad entries are entered into a keypad register that is also accessible through an I$^2$C port. In DSP or transparent mode, the key entry is used for directing the play back and volume/tone control, and the key pad is always used when the integrated circuit is used to play back.

As will be appreciated, in one embodiment the device is self contained to operate in the off mode. An onboard ATAPI interface and controller can access a file system in CDROM and read MP3 files for play back without any assistance from the main processor. Furthermore, in some embodiments, the CD-RW may be manually switched to the on position so that it may work simultaneously to the CPU. In this way, a user may listen to an MP3 audio file on a CD-RW attached to their PC while using their PC to access the internet for example.

Figure 1:
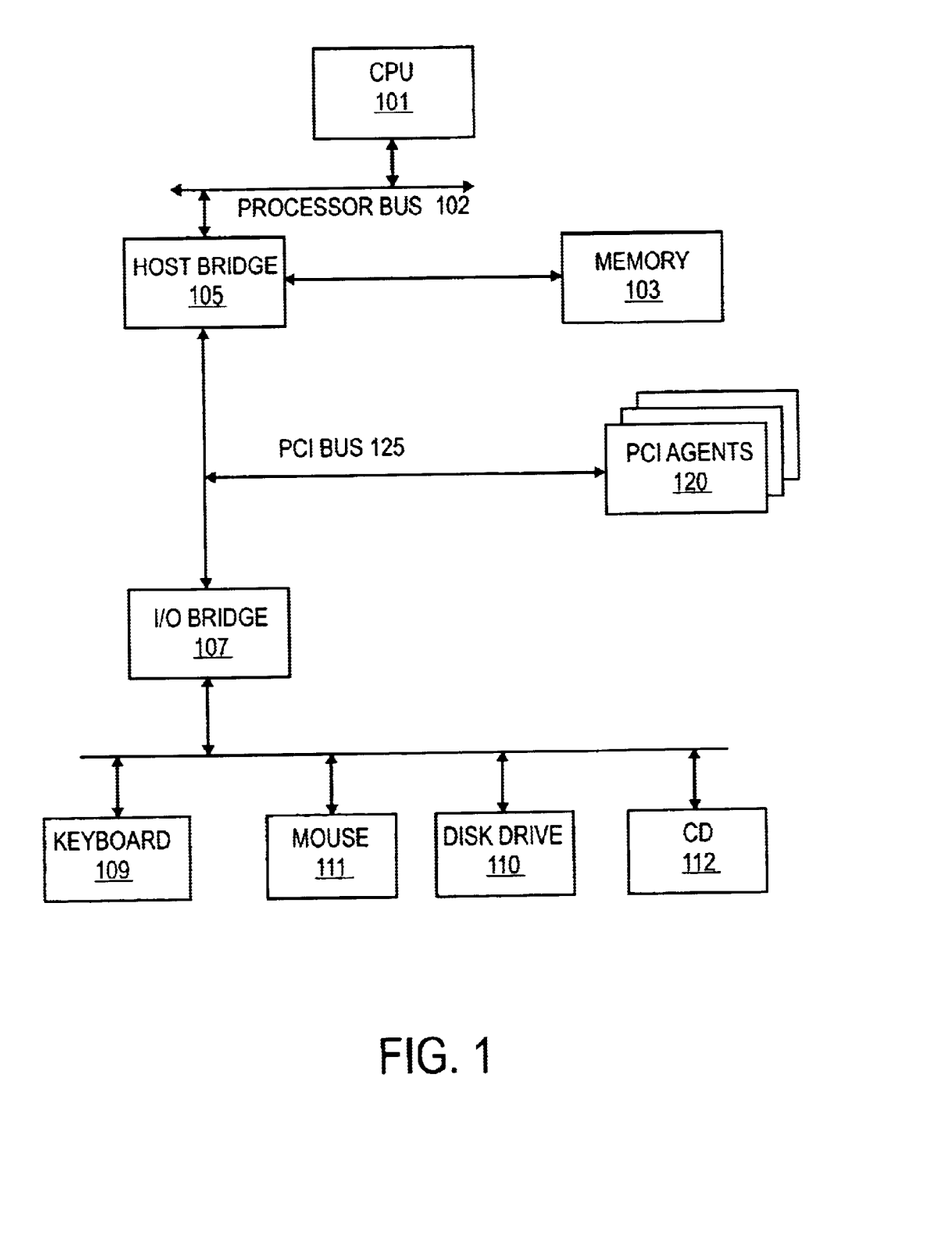
FIG. 1 illustrates an embodiment of a system.

FIG. 1 illustrates an embodiment of a system. CPU 101 (a Central Processor or Processor) is coupled through a Processor Bus 102 to a component referred to as a Host Bridge 105 (also sometimes referred to as the North Bridge), and thereby coupled to the rest of the system. Host Bridge 105 is coupled to Memory 103, the main memory of the system, and Host Bridge 105 is also coupled to I/O Bridge 107 (Input/Output Bridge also referred to as the South Bridge). I/O Bridge 107 couples to Keyboard 109, Mouse 111, CD 112 and Disk Drive 110, and may couple to other components in a bus or point-to-point fashion. Through these couplings, CPU 101 is coupled to each component in the system, and may read or write information to each of the devices (within the capabilities of those devices).

Further extending the complexity of the system, PCI Bus 125 (Peripheral Component Interconnect Bus based on the Peripheral Component Interconnect Bus Specification Revision 2.1 or 2.2 from the Portland PCI Working Group as published by Intel Corporation) may be involved in the coupling of Host Bridge 105 to I/O Bridge 107, and may thereby couple to PCI Agents 120. Thus, through Host Bridge 105, CPU 101 may communicate with PCI Agents 120.

Figure 2:
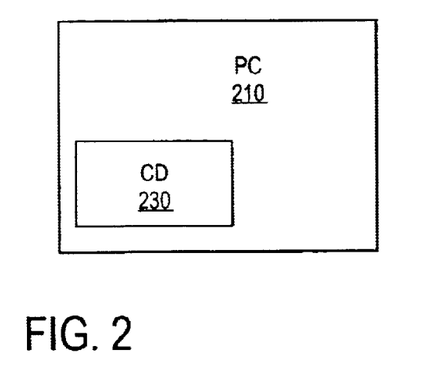
FIG. 2 illustrates an alternate embodiment of a system.
Figure 3:
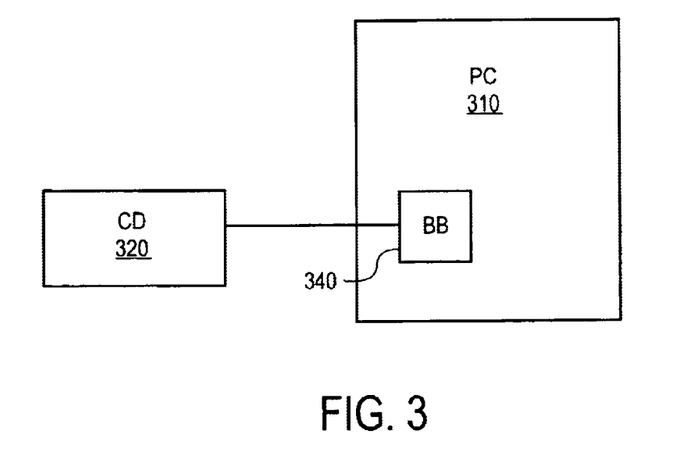
FIG. 3 illustrates another alternate embodiment of a system.
Figure 4:
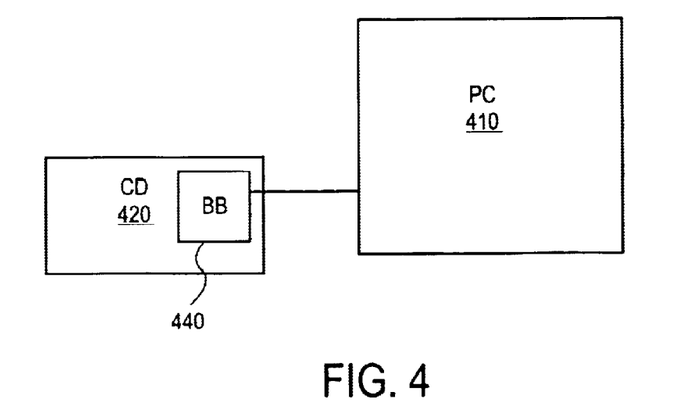
FIG. 4 illustrates yet another alternate embodiment of a system.

FIG. 2 illustrates an alternate embodiment of a system. PC 210 includes CD 230, which is an internal CD drive such as a CD-RW drive. Note that an integrated circuit interposed between the internals of CD 230 and its connection to PC 210 may perform the functions described earlier with respect to playing music on the CD drive 230. FIG. 3 illustrates another alternate embodiment of a system. PC 310 is a personal computer which includes BB 340, which is coupled to CD drive 320. BB 340 is an integrated circuit suitable for coupling to the CD drive 320 and for reading MP3 or similar files from the CD drive 320 for purposes of playing those files without intervention from a processor of PC 310. FIG. 4 illustrates yet another alternate embodiment of a system. PC 410 is a personal computer. CD drive 420 includes BB 440, which is coupled to the internal CD controller of CD 420 and to PC 410. BB 440 is an integrated circuit suitable for reading MP3 or similar files from the CD drive 420 for purposes of playing those files without intervention from a processor of PC 410.

Figure 5:
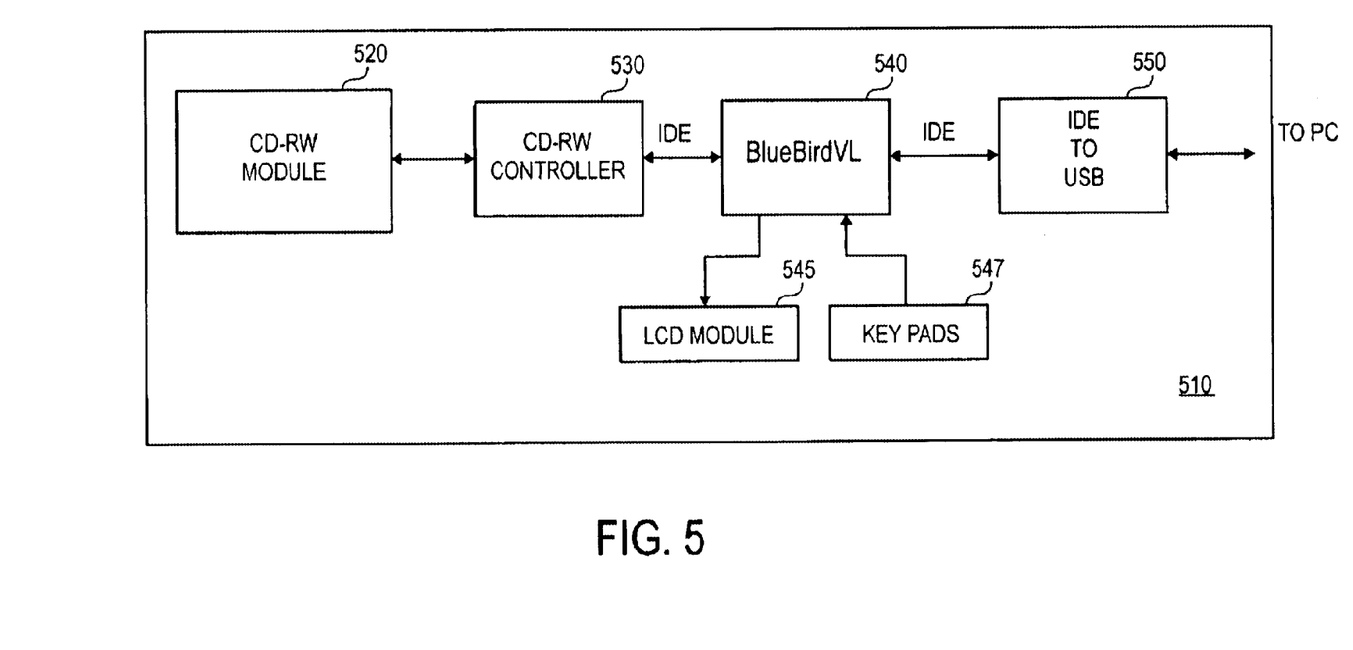
FIG. 5 illustrates an embodiment of a CD Drive.

FIG. 5 illustrates an embodiment of a CD Drive. CD drive 510 includes CD-RW module 520, CD-RW controller 530, Bluebird device 540, USB interface 550, LCD module 545 and keypad 547. USB interface 550 may be coupled to a PC, and is coupled to bluebird device 540. Bluebird device 540 is coupled to CD-RW controller 530, to keypad 547 for input purposes and to LCD module 545 for output purposes. CD-RW controller 530 is coupled to CD-RW module 520, which represents the electrical and mechanical portions of the CD-RW drive 510. In one embodiment, when no PC is connected, or when a connected PC is not accessing drive 510, bluebird device 540, embodied as an integrated circuit, may receive commands from keypad 547 to play tracks such as MP3 or other formats of audio files accessible through controller 530 and module 520. When playing the tracks, device 540 displays information about the track being played on LCD module 545 and draws power either from a power source within drive 510 or a power source coupled to drive 510 (such as a PC power source or a dedicated CD power source). When a connected PC accesses drive 510, bluebird device 540 either acts as a transparent passthrough path for signals between the PC and the controller 530, or first interrupts play of the track currently playing and then acts as a transparent passthrough path accordingly.

Figure 6:
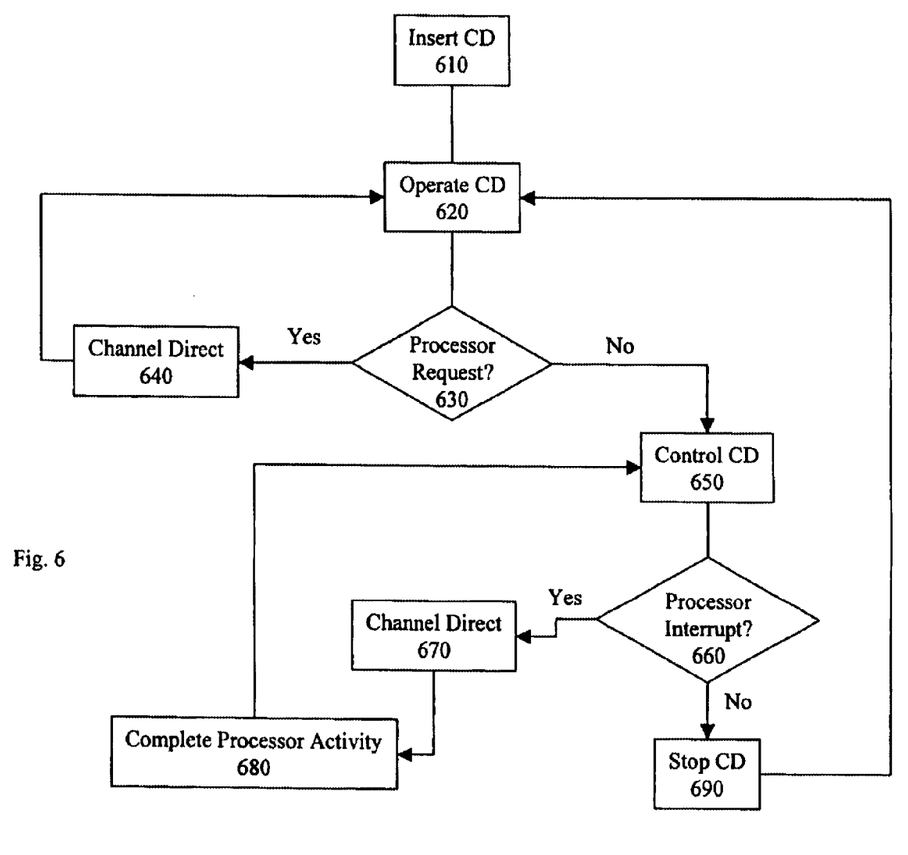
FIG. 6 illustrates an embodiment of a method.

FIG. 6 illustrates an embodiment of a method. At block 610, a CD is inserted into a drive. At block 620, a request to operate the CD is received. At block 630, a determination is made as to whether this is a processor request or a user request (such as through a keypad attached to the CD). At block 640, if the request is a processor request, signals are channeled directly between the processor of a connected PC and the controller of the CD drive. Upon completion of the operation, the process returns to block 620. If the determination at block 630 indicates the request is not a processor request, then, at block 650, the CD is controlled by an interposed device such as an integrated circuit. The integrated circuit directs the controller of the CD drive to play tracks on the CD based on the request. At block 660, an interrupt is received by the interposed device. If the interrupt indicates a request from the processor of an attached PC, then play of the track is suspended and the interposed device channels signals between the controller of the CD and the processor directly at block 670. At block 680, completion of the processor-requested activity is detected, and control of the CD returns to the interposed device. If the interrupt at block 660 is not a processor request, the CD play is stopped at block 690 to deal with the interrupt (either a termination or change in CD play) and the process returns to block 620.

Figure 7:
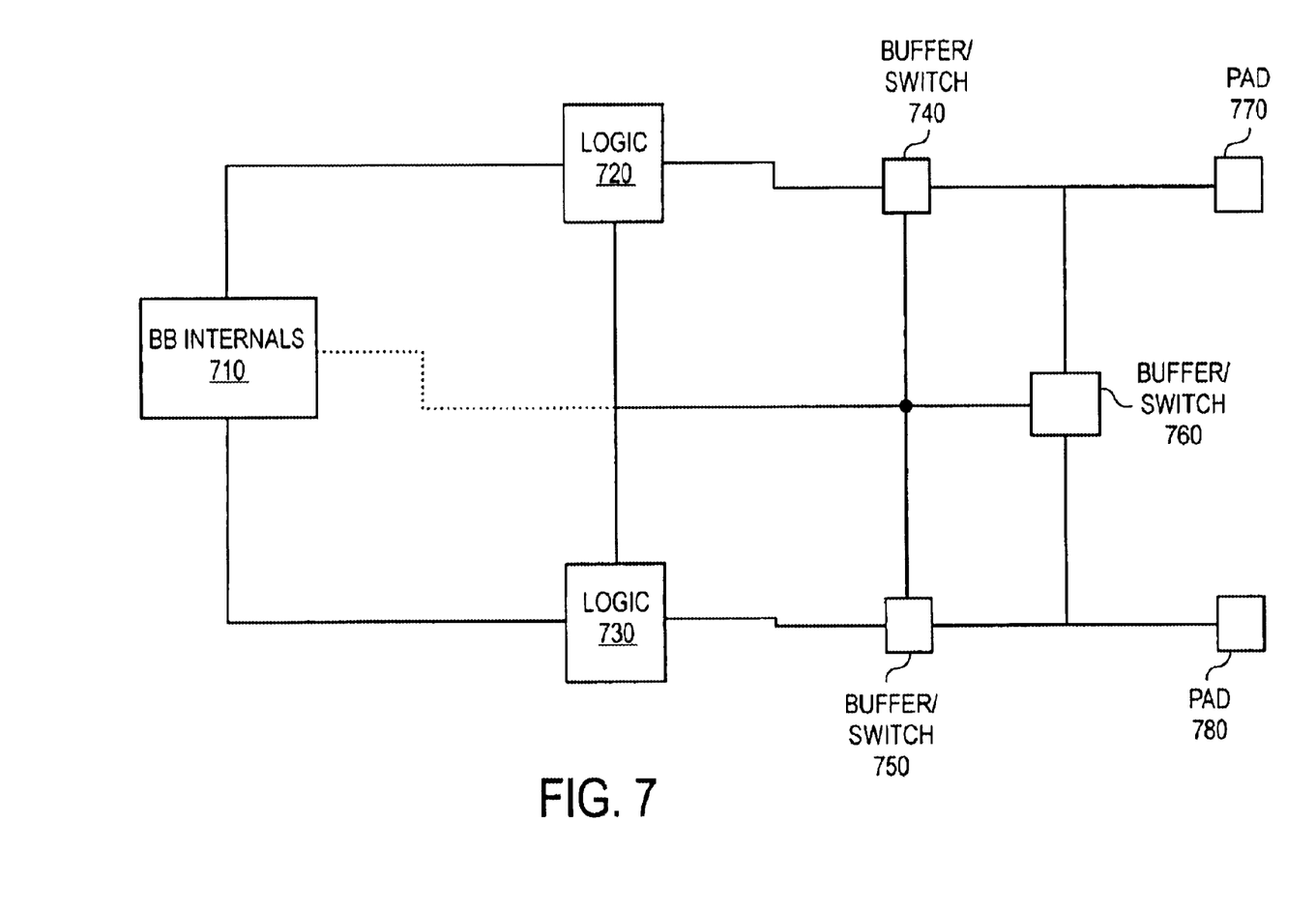
FIG. 7 illustrates an embodiment of an apparatus.

FIG. 7 illustrates an embodiment of an apparatus. BB internals 710 represent the internals of a device such as an integrated circuit designed to play MP3 or other formats of files from a storage device such as a CD-RW drive. Coupled to BB internals 710 are logic block 720 and logic block 730, each of which interface with a pin through one of block 740 and pad 770 or block 750 and pad 780 respectively. Block 760 couples directly to both pad 770 and pad 780. In one embodiment, blocks 740, 750, and 760 are selectively controllable buffers or switches, allowing for communications between the pads (770 and 780) and logic blocks (720, 730) or between the two pads directly. The blocks 740, 750 and 760 are controlled in one embodiment by the BB internals 710 but may also be controlled by one or more of the logic blocks 720 and 730 in alternate embodiments.

Figure 8:
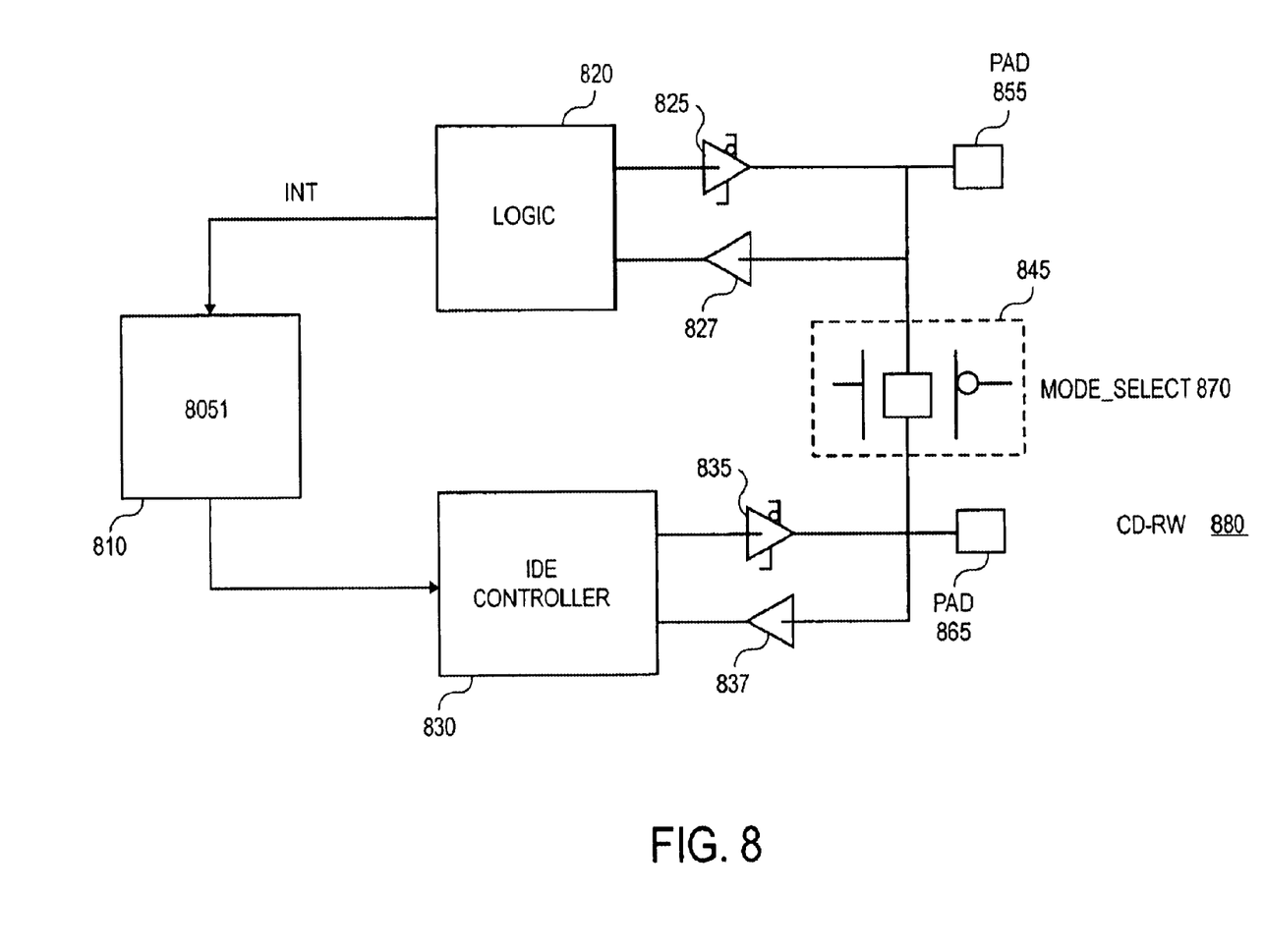
FIG. 8 illustrates an alternate embodiment of an apparatus.

FIG. 8 illustrates an alternate embodiment of an apparatus. CD-RW 880 incorporates a microcontroller 810 (model 8051) which is coupled to logic 820 through an interrupt input. Microcontroller 810 controls IDE controller 830. Logic 820 is coupled to a first pad 855 through a tri-state buffer 825 and a non-inverting buffer 827. Similarly, IDE controller 830 is coupled to a second pad 865 through a tri-state buffer 835 and a non-inverting buffer 837. Additionally, first pad 855 and second pad 865 are both coupled to opposite ends of pass gate 845, which in turn is controlled by a signal 870 (mode_select). In one embodiment, microcontroller 810 controls whether logic 820 and IDE controller 830 have access to pads 855 and 865, or whether the two pads 855 and 865 are coupled to each other through pass gate 845. As will be appreciated, this may be replicated for a set of pads on an integrated circuit, allowing for a selectable passthrough or intercept of signals on a bus coupled to the integrated circuit. In one embodiment, when the microcontroller 810 is controlling access to pad 865, and an interrupt is received from logic 820, a shift to a passthrough state is made until access to the bus is no longer needed by an outside device, and then the passthrough state is cutoff.

Figure 9:
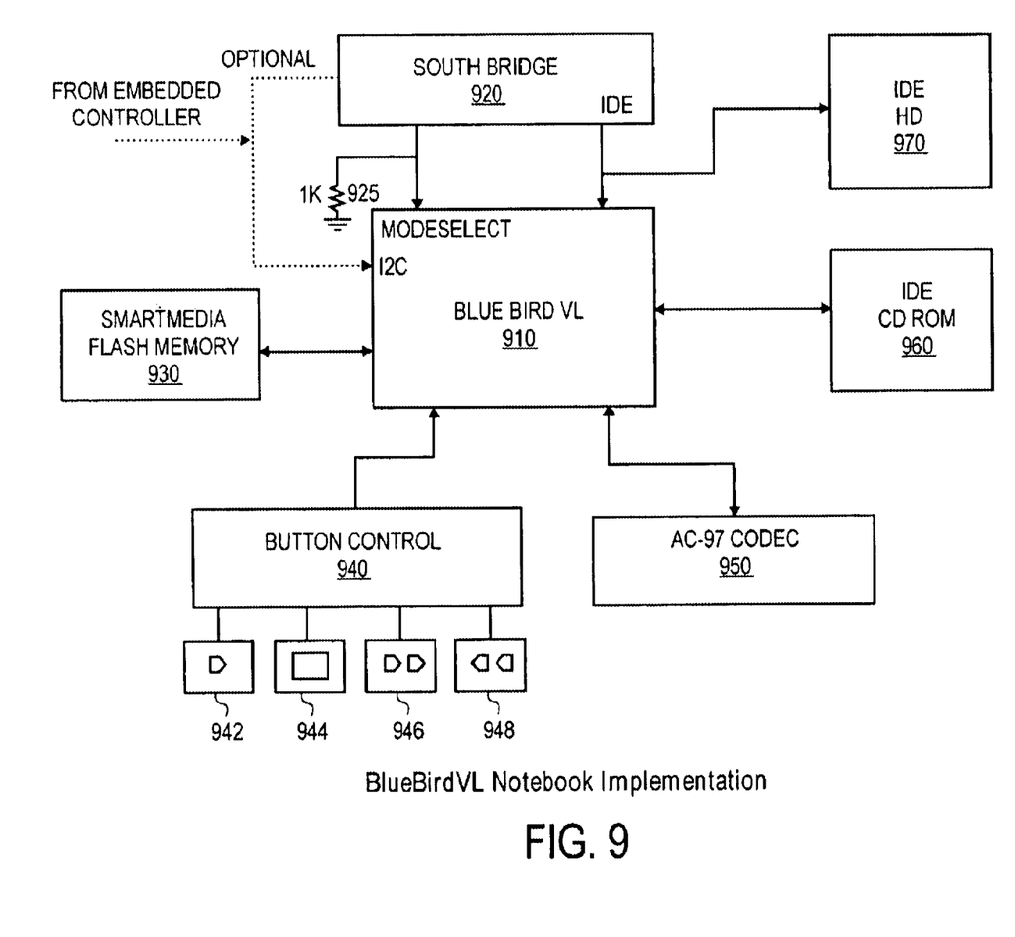
FIG. 9 illustrates yet another alternate embodiment of a system.
Figure 10:
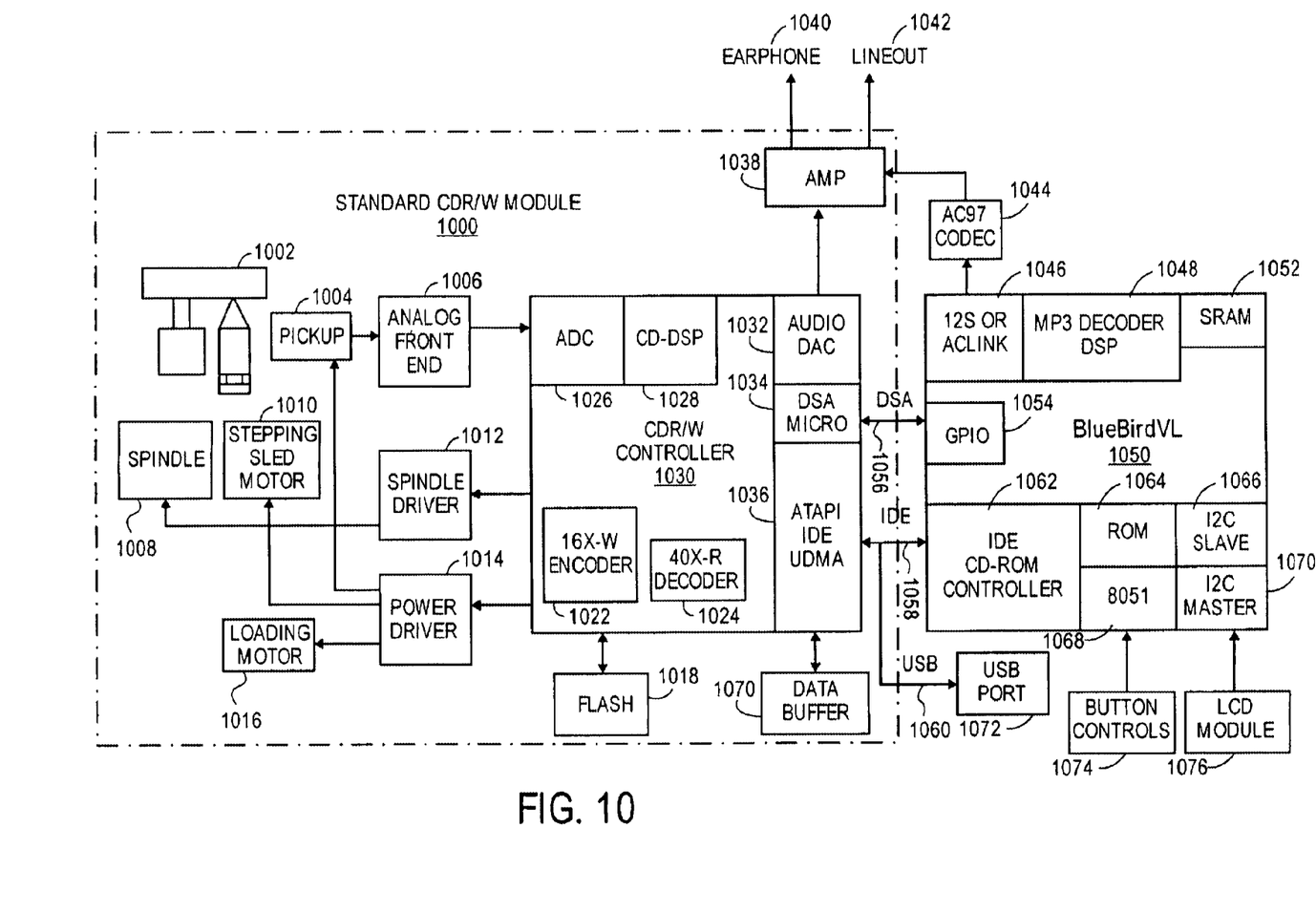
FIG. 10 illustrates an alternate embodiment of a CD Drive.
Figure 11:
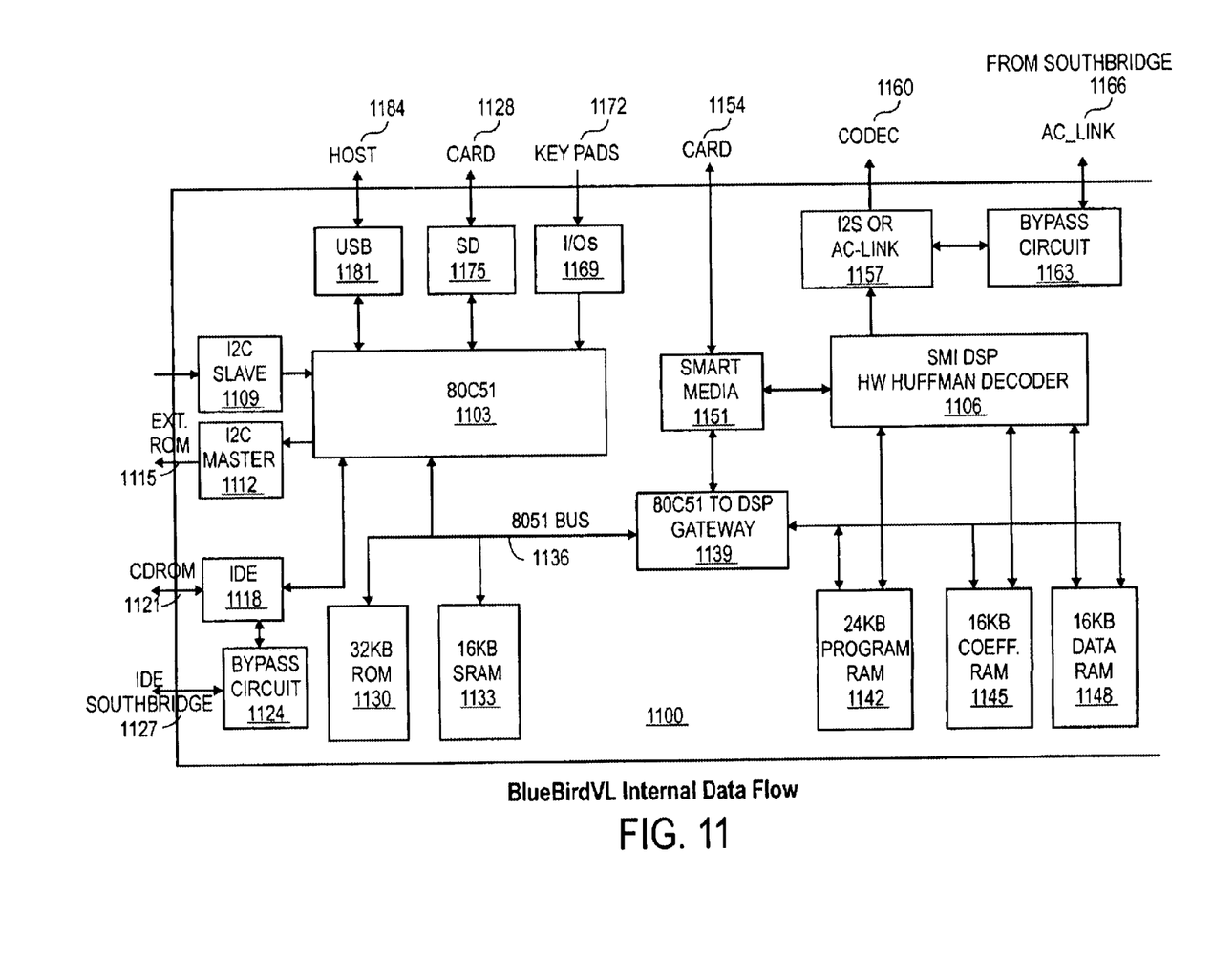
FIG. 11 illustrates another alternate embodiment of an apparatus.

FIG. 9 illustrates yet another alternate embodiment of a system. FIG. 10 illustrates an alternate embodiment of a CD Drive. FIG. 11 illustrates another alternate embodiment of an apparatus.

With respect to FIG. 9, an integrated circuit 910 is illustrated. The device 910 is coupled to a south bridge 920 including through an IDE interface, which is also coupled to an IDE hard drive 970, and through a control signal to a MODE_SELECT input with a pulldown default 925. The device 910 is also coupled to an IDE CD-ROM 960. Furthermore, the device 910 is coupled to an AC-97 codec 950 (for coding and decoding of audio signals for example), a button control 940 (for input from buttons 942, 944, 946 and 948) and to a FLASH memory 930 (such as a a SmartMedia® memory). Device 910 may be used to provide transparent access to the CD 960 from a processor coupled to the South Bridge 920. Device 910 may also be used to independently access and decode MP3 or other files from CD 960 when no processor is accessing CD 960 or when no device is detected as attached to CD 960 (such as when an attached PC is off). As will be appreciated, an optional connection to a micro-controller or other device suitable for controlling a system may be implemented. Furthermore, as will be appreciated, external components as depicted in FIG. 9 may be integrated into device 910, or portions of device 910 may be implemented as separate components.

With respect to FIG. 10, a standard CD-RW module 1000 is illustrated, coupled to a device 1050. Device 1050 may be used to read and play audio files in MP3 or other formats accessible on a CD in module 1000. Apparatus 1002 represents the mechanical portion of module 1000, which includes a pickup 1004, spindle 1008, stepping sled motor 1010, and loading motor 1016. These components interface with analog front end 1006, spindle driver 1012 and power driver 1014 to allow for control of apparatus 1002 by controller 1030. Controller 1030 includes an ADC 1026 (analog-to-digital converter), a CD-DSP 1028 (a DSP suitable for converting output of ADC 1026 into a useable format), and Audio DAC 1032 (digital-to-analog converter for converting encoded signals into sounds), which collectively allow for play of CD-DA formatted audio tracks through AMP 1038 (an amplifier) to either an earphone jack 1040 or a lineout jack 1042. Controller 1030 also includes a write encoder 1022 and a read decoder 1024 for processing data into a format for writing to the CD (1022) or providing to an external system (1024). Controller 1030 also includes DSA micro interface 1034 and ATAPI IDE interface 1036 (which may further include a USB interface). Furthermore, controller 1030 interfaces with a FLASH memory 1018 and a data buffer 1020 which may be utilized for processing of data read from or written to a CD.

Enhancing module 1000 is device 1050. Device 1050 is, in embodiment, an integrated circuit including a I2S or ACLINK interface 1046, an MP3 decoder DSP 1048, an SRAM 1052, a GPIO interface 1054, an IDE CD-ROM controller 1062, a ROM 1064, an I2C slave interface 1066, an I2C master interface 1070, and a microcontroller 1068 (such as an 8051 microcontroller core). Button controls 1074 are coupled to the microcontroller 1068, and LCD module (display) 1076 is coupled to I2C master 1070. IDE bus 1058 couples IDE controller 1062 to the ATAPI IDE interface 1036, allowing for control of the module 1000 by the device 1050. Further control and communication may occur through use of DSA bus 1056 coupling GPIO interface 1054 to DSA micro interface 1034. Moreover, an AC97 codec 1044 is coupled to I2S or ACLINK interface 1046 and to ANT 1038, allowing for output of audio signals as decoded by device 1050 to earphone jack 1040 or lineout jack 1042. As illustrated, USB port 1072 is coupled to module 1000 through USB bus 1060, allowing for coupling to devices via a USB connection.

As will be appreciated, the implementation of device 1050 described above may access MP3 files (or other formats if the DSP 1048 is reprogrammed) from module 1000 and output those files in audio form through the amplifier 1038 of module 1000, without requiring a radical redesign of module 1000.

Turning to FIG. 11, device 1100 is illustrated. Included are a microcontroller core 1103 (an 80C51 core for example) and a DSP 1106. Microcontroller 1103 couples to an I2C slave interface 1109 and an I2C master interface 1112, along with an IDE interface 1118. An external ROM 1115 may be coupled to the I2C master interface 1112 for example. A CD-ROM 1121 may be coupled to the IDE interface 1118. Furthermore, bypass circuit 1124 is also coupled to the IDE interface 1118 and may also be coupled to a Southbridge IDE interface 1127 such as may be found in a laptop or other PC. Microcontroller 1103 may also be coupled to a USB interface 1181 (which may couple to a host 1184 such as a computer), to a SmartData interface 1175 (which may couple to an external card 1178 or other device) and to an I/O interface 1169 which may couple to a keypad 1172. Also coupled to microcontroller 1103 is an internal 8051 bus 1136 which may couple to internal ROM 1130 and RAM 1133 along with a microcontroller to DSP gateway 1139.

Gateway 1139 may be coupled to a Smart Media interface 1151 which in turn may couple to an external card 1154 for example. Smart Media interface 1151 may also couple to DSP 1106, allowing for reprogramming of DSP 1106 for example. DSP 1106 may couple to an internal program RAM 1142, an internal coefficient RAM 1145 and an internal data RAM 1148, each of which may also be coupled to gateway 1139. Furthermore, DSP 1106 may be coupled to I2S or ACLINK interface 1157 which allows for coupling to an external codec 1160 (which may be used to code audio signals). Interface 1157 may also be coupled to a bypass circuit 1163 which is coupled to an external ACLINK interface 1166 such as may be found in a laptop or other PC.

The bypass circuits 1163 and 1124 thus allow for bypassing of the device 1100 when either an associated CD drive is to be accessed by an associated processor external to device 1100, or when an amplifier of the associated CD drive is to be accessed by the associated processor. This allows for transparency of the device 1100. When the device 1100 controls the associated CD drive, the DSP 1106 may be used to access and decode MP3 or similar format files, while the microcontroller 1103 may be used to control access to the CD drive (both selection of songs via keypad 1172 for example and access by the associated processor).

The following description generally describes alternative embodiments. Note that this description may include restrictions or specific examples which are appropriate to a specific embodiment, but which are exemplary in nature rather than limiting of the scope of the present invention.

BlueBirdVL is a low-power, single chip MP3 player with a direct IDE interface to CDROM drive. It incorporates an MP3 decoder, a 8051 micro-controller, and IDE ATAPI, keypad and CODEC interfaces.

BlueBirdVL may be useful for low-power MP3 playback applications such as a laptop while in OFF mode. In OFF mode, BlueBirdVL disconnects the IDE bus from the host chip set and access the CDROM on that IDE bus directly. It provides much longer hours of operation than if it were using the main processor, more than five times the play time of a typical system. When the system is in ON mode, the IDE bus is controlled by the host chip set and BlueBirdVL is completely transparent to the system. However, the keypad controls are functional in order to provide notebook users ease of control while listening to music when the notebook is on.

BlueBirdVL is self contained to operate in the OFF mode. On board ATAPI interface and controller can access file system in CDROM and read MP3 files for play back without any assistance from the main processor. BlueBirdVL supports popular the CDROM file system.

MP3 decode is performed by the on-chip DSP and memories. The DSP is well tuned for efficient MP3 decode and audio processing, with less than 100 mW of power consumption in full operation mode.

System Implementation

In a typical PC/Laptop application, BlueBirdVL is connected between the Host South Bridge IDE (H_IDE) and the CDROM IDE (C_IDE). During normal PC operation, BlueBirdVL is in transparent mode and the system accesses the CDROM normally (as if BlueBirdVL is not there). In OFF mode, BlueBirdVL reads MP3 music files from the CDROM, decodes the files and outputs a decoded audio stream by way of the ACLINK port. When the Laptop is in OFF mode, BlueBirdVL, the ACLINK audio DAC and the CDROM are still active for the audio playback.

Modes of Operation

DSP Mode

BlueBirdVL can be configured for different modes of operation (DSP mode or transparent mode) by a MODE_SELECT signal.

In DSP Mode operation (MODE_SELECT=0), BlueBirdVL isolates the CDROM from Host port and accesses CDROM for files with MP3 extension, the dot MP3 files. The CDROM directory will be traversed and a play list of MP3 files is built in alphabetical sequence.

Normal audio CD (CD_DA format) is also supported. In this case the playback is by track number as with a regular audio CD.

Transparent Mode

In transparent mode (MODE_SELECT=1), the Host IDE port is connected to the CDROM IDE and BlueBirdVL does not access the CDROM. The ACLINK port is also inactive but keypad entry is still registered and accessible through the I²C port.

Functional Block

I²C Interface

The I²C port is used for accessing control register, such as Volume and Tone registers. Key pad inputs are also accessible through I²C port in either transparent mode or in DSP mode. I²C operating frequency range is 100 KHz–400 KHz.

Key Pad Control

Key pad entries are entered into keypad register that is also accessible through I²C port. In DSP or transparent mode, the key entry is used for directing the play back and volume/tone control.

The BlueBirdVL's internal ROM defines the functionality of the 8 keypads as below:

| BlueBirdVL pin name | Function |
|---|---|
| Key0 | Back plays the previous song on the play list |
| Key1 | Skip jumps to the next song on the play list |
| Key2 | Play/Pause toggles between Play and Pause |
| Key3 | Stop/Eject/Load toggles between Stop, Eject and Load |
| Key4 | Volume Down decreases the volume |
| Key5 | Volume Up increases the volume |
| Key6 | Mute Volume |
| Key7 | Lock. Once this key is pressed, all the other key 0–6 are inactive. |

ATAPI Control

The ATAPI controller performs access to IDE/ATAPI register, both CD_XA and CD_DA structure.

CD_XA, ISO and JOLIET file extensions are supported. The directory structure is traversed and files with MP3 extensions are collected for building a Play List. A play list is built when a KEY LIST signal is asserted.

The ATAPI controller reads files in the Play List and feed the data to the DSP for decoding. At the end of the list, it repeats the Play List from the beginning. When a KEY_SKIP signal is asserted, the file that's being played is removed from the Play List until a new Play List is build.

DSP

The DSP core is well optimized for audio decompression and processing with on board data and program memory; with its Huffman decoder that is optimized for MP3 encoding. For MP3 decode, less than 18MIPs is needed.

ACLINK

In DSP mode, BlueBirdVL disconnects ACLINK from the host and becomes the ACLINK controller to the codec. The decoded audio is sent to the codec.

The input stream from ADC (of the ACLINK codec), if enabled is mixed into the output stream sent to DAC. This feature can be used for Karaoke applications.

When BlueBirdVL is in transparent mode, ACLINK from Host is connected to the codec and it is as if the Host connected directly to the codec.

I²C Interface

BlueBirdVL supports both master and slave I²C operation. The I²S port is used to interface for audio codec. I²S operating frequency range is 11 MHz–24 MHz.

I²C Device Address

BlueBirdVL supports four I²C device addresses which are determined by the pins F_DD0 and F_DD1 as follows (note that a 0 means the pin is pulled down while a 1 means the pin is pulled up):

F_DD[1:0] is used to select I²C programming address.
F_DD[4:2] controls how many headers to discard.

Since we're not using SMB header information, we discard the header byte(s). For example, to discard 1 byte from the I2C header information, they need to program F_DD[4:2] to "001".

LCD Module Interface

BlueBirdVL uses the I²C master to interface with an LCD module. The LCD module is supported only in DSP mode when the system is OFF. In transparent mode, the LCD module interface is inactive.

External Upgrade EPROM

BlueBirdVL uses the I2C master to interface with an external upgrade ROM.

DSP Core—This DSP core, with its associated on-chip memories, is perfectly functional up to a clock rate of 50 MHz. The DSP core is the main processing unit.

Integrated RAM Memory—the BlueBirdV contain on chip RAM that is divided into three parts: a program memory (24 KB) for DSP core, a coefficients memory (16 KB) for DSP core, and a data memory (16 KB) for DSP core 8051 Interface—The interface is used to connect 8051 micro-controller and is mainly a host processor for the DSP core. The 8051 micro-controller will serve as the controller for the interface modules such as SmartMedia, I²C, etc. It also handles user interface functions, and takes care of housekeeping functions.

I²C Interface—The BlueBirdV supports I²C port in master mode. I²C port is used for access control registers such as volume and tone controls. I2C master interface can be used to drive the external EPROM.

AC link/PS Interface—AC link provide a glueless connection to an AC97 compatible audio codec, while I²S interface is used fro I²S audio codec.

Parallel I/O Interface or SmartMedia Interface—The BlueBirdV parallel Interface (PIO) consists of an address cycle and a data cycle. When both are present, PIO is being used for flash memory; otherwise, it serves as a general purpose parallel Interface. SmartMedia interface could be used to connect to a SmartMedia card and/or a flash memory without external logic.

BlueBirdV Firmware

The BlueBirdV firmware includes 8051 firmware and DSP firmware. The DSP firmware performs DSP functions such as MP3 decoding, noise cancellation, and etc. The 8051 firmware handles the data transfer and system function such as SmartMedia data transfer, handle the push button, and etc.

The BlueBirdV 8051 firmware code contains the following functional blocks: DSP code download, push button key handler, data stream transfer, I²C controller handler, and SmartMedia interface handler.

System Interface

BlueBirdV has various hardware and software features used to control the system interface. The section below describes each of the system interfaces in detail.

Clock Signals

MClk is the main clock for the BlueBirdV. Outside crystal/oscillator is required. The frequency is based on the audio sample rate; it is between 18 to 50 Mhz. For example, if audio sample rate is 44.1 khz, MClk could be 42.336 MHz (44.1×16×60).

The following resources are available in the device:

DSP core—This DSP core, with its associated on-chip memories, is perfectly functional up to a clock rate of 80 MHz. The DSP core is the main processing unit.

8051 core—the built-in 8051 core is mainly designed to be an on chip host processor for DSP core, it will serves as the controller for the interface modules such as IDE, USB, $I^2C$ etc., it also handles user interface functions, and takes care of housekeeping functions. The 8051 core has a limited operating clock frequency of up to 50 MHz, however when operate the USB module, the maximum clock rate is reduced to 30 MHz.

RAM Memory— the BlueBirdVL contain on chip RAM that is divided into four parts: a program memory (24 bit by 8K PM) for DSP core, a coefficients memory (16 bit by 8 K PM) for DSP core, a data memory (16 bit by 8K DM) for DSP core, a configurable memory (8-bit by 8K) for 8051 core.

ROM Memory— A ROM of size 8 bit by 32K stores firmware code for bootup, and the standard build-in features for the BlueBirdVL chip.

$I^2C$—There are two $I^2C$ port on BlueBirdVL, one for master mode and the other slave mode. The 12 port is used for access control registers such as volume and tone controls. Keypad inputs are also accessible through the $I^2C$ port in either DSP or transparent mode. I2C master interface can be also used to control external upgrade ROM support or drive a LCD module display.

USB controller— The USB interface on BlueBirdVL only supports slave mode, it provides a connection to a USB device that operate in master mode. (This is a feature of BlueBirdVL+.)

AC link1$I^2$S—AC link provide glueless connection to AC97 compatible audio codec, while $I^2S$ interface is used for $I^2S$ audio codec.

SmartMedia—SmartMedia interface could be used to connect to a SmartMedia card and/or a flash memory without external logic.

SD flash controller— SD flash controller handles the data transfer protocol for SD flash memory.

Keypad controller— Provides the hardware interface for push button controls. For standard ROM support of the keypad features, please refer to the BlueBirdVL standard ROM specifications.

Firmware support—The BlueBirdVL firmware includes 8051 firmware and DSP firmware. The DSP firmware performs DSP functions such as MP3 decoding, noise cancelling etc. The 8051 firmware handles the data transfer and system function such as IDE data transfer, USB data transfer, sense and handle the push button etc.

The BlueBirdVL 8051 firmware code contains the following functional blocks: DSP code download, push button key handler, data stream transfer, firmware upgrade, IDE interface handler, USB controller handler (BlueBirdVL+), $I^2C$ controller handler, SmartMedia interface handler, and SD memory handler.

Power-On Procedure

This chapter describes the BlueBirdVL power-on and boot procedure and main program flow of the 8051 firmware for housekeeping.

At power on, all the modules in the BlueBirdVL are reset through global power on reset. The BlueBirdVL chip has four operation mode, they are selected during the chip reset through the use of two signals: TEST and MODE_SELECT.

In transparent mode, the BlueBirdVL chip will be transparent to the notebook, the IDE signals from south bridge are passed directly through the chip to CDROM drive and vice versa. The same is true for AC link. Thus the chip remains in the reset state.

In DSP mode, the BlueBirdVL chip is used to play MP3 file and other functions when the notebook PC is OFF. When the BlueBirdVL DSP mode is selected, after the reset, the DSP core is disabled, and the 8051 starts execution from the internal ROM. The 8051 is now responsible for startup and coordinates the operation of the BlueBird chip through the execution of 8051 firmware.

The Scan and Test mode are used to scan and test the chip, it should not be selected during normal usage.

Reset

Toggle~RST pin and power-on reset will occur. Since the transparent mode is selected as default during the reset, it is important to take care of the MODE_SELECT and TEST pins. Both active and passive methods can be used to select the mode. The passive method involves the use of a pull-up or pull-down resistor connected to the MODE_SELECT and TEST pins. The active method involves the use of external logic.

Initialization

After the reset, BlueBirdVL will automatically configure itself with standard function as follows. No special procedure from the system side is needed.

Clock Signals

MCLK is the main clock for BlueBirdVL. An outside oscillator is required. The frequency can range between 18 MHz 50 MHz and is a function of the interface being employed. For example, $I^2S$ operates 512 times the frequency sample while ACLink has no real limitation but is a function of the performance required.

Reset

Hardware Reset

~RST halts execution and causes the hardware reset of the chip. The ~RST signal must be asserted when the processor is powered up to assure proper initialization. This signal is active low.

Software Reset (DSP Reset)

When bit [1] in the Chip Control Register is set to "1", it causes reset on the DSP only. This register can be programmed by the host controller. Before deasserting the software reset, the host controller should load the proper program into the PM.

System Power Down

When pin~PWR_DN is asserted, the main clock, MCLK, is turned Off.

Sleep Mode

During Sleep Mode, Bluebird is running at a slow clock, which is 1/32 of MCLK. To enter sleep mode, the following register needs to be programmed: EnClkSlow [0]=1 (Address: 0xC0D5h). The Sleep feature can not be used fro SCAN or Memory Test

Keypad Interface

The BlueBirdVL chip has eight input pins dedicated for a push button keypad. These eight inputs are directly connected to IO port three of the built-in 8051 core.

In addition, they are OR'ed together to generate a interrupt signal. The interrupt signal are wired to IE10 which has a vector of 0x0053. The interrupt is triggered at the falling edge of the keypad signal.

If any keypad is pressed, the signal goes low and an Interrupt is generated. Due to the simple hardware interfaces, care must be taken when designing firmware to serve the keypad interrupt. About 40 mS debounce delay must be executed, when checking the port for a keypad hit PORT3 input value will be sampled as keypad code, however, if a keypad is used, a user defined keypad code should be generated depending on which keypad has been hit. In the initial version of built-in ROM code, the data from PORT3 is used as key code directly.

The interrupt service routine for a keypad hit should include the following operations:

Read ClrKeyIRQ register (0xc0d3) to clear the interrupt

Write 0 to ExtHostIRQ register (0xc0d2) to generate INTR to host

Write key code value to $I^2C$ interface module DOUT register (0xc0d1) for host.

Note: The INTR must be cleared, when a $I^2C$ read interrupt is generated by a host read. For example, inside the $I^2C$ interrupt service routine, a read ExtHostIRQ (0xc0d2) must be executed.

$I^2S$ Transmit/Receive Interface

Serial Interface Conventions

BlueBirdVL supports a bi-directional bus oriented protocol with both transmit and receive capabilities. The $I^2S$ protocol defines any device that sends data onto the bus as a transmitter, and the receiving device as the receiver. The device controlling the transfer is called the master and the device is being controlled is called the slave. The master always initiates data transfers, and provides the clock for both transmit and receive operations. In this context, BlueBirdVL is the master. Therefore, the devices in this family operate as slaves in all applications.

Serial Clock and Data

Data states on the Serial Data (SDT) line can change only during Serial Clock (SCT) LOW. SDT state changes during SCT HIGH are reserved for indicating start and stop conditions.

$I^2C$ Interface

The $I^2C$ port may be used for accessing control registers, such as the Volume and Tone registers. Key pad inputs are also accessible through the ft port in either transparent mode or DSP mode.

BlueBirdVL supports both the $I^2C$ slave and master interfaces. The slave interface is used for code download and for interfacing with the system. The master interface is used for LCD module display and optional external EPROM. The following serial start and stop conditions are common to both interfaces.

Serial Start Condition

All commands are preceded by the start condition, which is a HIGH to LOW transition of SDT when SCT is HIGH. The device continuously monitors the SDT and SCT lines for the start condition and will not respond to any command until this condition has been met.

Serial Stop Condition

All communications must be terminated by a stop condition, which is LOW to HIGH transition of SDT when SCT is HIGH. The stop condition is also used to place the device into the Standby power mode after a read sequence. A stop condition can only be issued after the transmitting device has released the bus.

$I^2C$ Slave Protocol

In general, this section describes one I2C protocol which may be suitable.

Format

The transfer packet is composed of three fields: the SYNC, Identifier, and Data fields.

SYNC Field

All packets begin with an eight-byte synchronization field which can be filled with a string of eight hexadecimal numbers from 0x00h to 0x07h.

Identifier Field

A packet identifier immediately follows the SYNC field for every packet. The identifier is a two-byte code that defines the data following in a packet as follows:

Data Field

The data field immediately follows the identifier and is defined by the value of the identifier field.

Identifier=0x0000

When the identifier is 0x0000, indicating that the data field will contain a command, the command which follows is composed of two subfields: The Command and Parameters fields.

Identifier=0x8000–0xC0FF

When the identifier is 0x8000–0xC0FF, the data following in the data field will be raw data for 8051 memory mapped locations.

Identifier=0xC100

When the identifier is 0xC100, indicating that the data is code to be loaded into DSP core memory and IO registers, the data field contains first a two-byte DSP memory address followed by the data to be written.

Identifier=0xC10A

When the identifier is 0xC10A, indicating the data is the code to be loaded into DSP core 10 registers, the data field contains the one byte DSP IO register address followed by the data to be written.

Upgrade ROM Format

When the command code is 0x0FF, the formatted data which follows will be upgraded ROM. This data always begins with an ID code followed by any number of packets as defined above and is always terminated with an END command. The external upgrade ROM should contain the following ordered fields:

ID Code.

The ID code always begins with the character string "SMIUPDT followed by a 4 digit version number. For example, a BlueBirdVL upgrade to ROM code version 01.01 would have ¢SMIUPDT0101" as its ID code.

Upgrade CMD packet

List of transfer packets

END command $I^2C$ Master Interface

All masters generate their own clock on the SCL line to transfer messages on the I²C-bus. Data is only valid during the HIGH period of the clock A defined clock is therefore needed for the bit-by-bit arbitration procedure to take place.

Synchronization

Clock synchronization is performed using the wired-AND connection of I²C interfaces to the SCL line. This means that a HIGH to LOW transition on the SCL line will cause the devices concerned to start counting off their LOW period and, once a device clock has gone LOW, it will hold the SCL line in that state until the clock HIGH state is reached. However, the LOW to HIGH transition of this clock may not change the state of the SCL line if another clock is still within its LOW period. The SCL line will therefore be held LOW by the device with the longest LOW period. Devices with shorter LOW periods enter a HIGH wait-state during this time.

When all devices concerned have counted off their LOW period, the clock line will be released and go HIGH. There will then be no difference between the device clocks and the state of the SCL line, and all the devices will start counting their HIGH periods. The first device to complete its HIGH period will again pull the SCL line LOW.

In this way, a synchronized SCL clock is generated with its LOW period determined by the device with the longest clock LOW period, and Rs HIGH period determined by the one with the shortest clock HIGH period.

Arbitration

A master may start a transfer only if the bus is free. Two or more masters may generate a START condition within the minimum hold time of the START condition which results in a defined START condition to the bus.

Arbitration takes place on the SDA line, while the SCL line is at the HIGH level, in such a way that the master which transmits a HIGH level, while another master is transmitting a. LOW level will switch off its DATA output stage because the level on the bus doesn't correspond to its on level.

Arbitration can continue for many bits. Its first stage is comparison of the address bits. If the masters are each trying to address the same device, arbitration continues with comparison of the data. Because address and information on the I²C-bus is used for arbitration, no information is lost during this process.

A master which loses the arbitration can generate clock pulses until the end of the byte In which it loses the arbitration.

If a master also incorporates a slave function and it loses arbitration during the addressing stage, it's possible that the winning master is trying to address it. The losing master must therefore switch over immediately to its slave-receiver mode.

The moment there is a difference between the internal data level of the master generating DATA 1 and the actual level on the SDA line, its data output switched off, which means that a HIGH output level is then connected to the bus. This will not affect the data transfer initiated by the winning master.

Since control of the I²C-bus is decided solely on the address and data sent by competing masters, there is no central master, nor any order of priority on the bus.

Special attention must be paid if, during a serial transfer, the arbitration procedure is still in progress at the moment when a repeated START condition or a STOP condition is transmitted to the I²C-bus. If it's possible for such a situation to occur, the master involved must sent this repeated START condition or STOP condition at the same position in the format frame. In other words, arbitration isn't allowed between:

A repeated START condition and a data bit

A STOP condition and a data bit

A repeated START condition and a STOP condition.

In addition to being used during the arbitration procedure, the clock synchronization mechanism can be used to enable receivers to cope with fast data transfers, on either a byte level or a bit level.

On the byte level, a device may be able to receive bytes of data at a fast rate, but needs more time to store a received byte or prepare another byte to be transmitted. Slaves can then hold the SCL line LOW after reception and acknowledgment of a byte to force the master into a wait state until the slave is ready for the next byte transfer in a type of handshake procedure.

On the bit level, a device such as a microcontroller without, or with only a limited hardware I²C interface on-chip can slow down the bus clock by extending each clock LOW period. The speed of any master is thereby adapted to the internal operating rate of this device.

AC'97 Audio Controller

This section is based on the AC'97 Rev. 2.0 specification (draft rev. 0.96). AC'97 includes the following audio features:

Independent (FDX) channels for stereo PCM in, stereo PCM out, and mono Mic in

Supports 16-bit samples for stereo PCMout

Supports multiple sample rate AC'97 2.0 codes (48 KHz and below)

Supports dual codec implementations for audio in mobile

Supports read/write access to all Primary and Secondary AC'91 registers

BlueBirdVL does not support the following AC'97 Rev. 2.0 specification features:

Support for additional 4 channels of PCM (center, L surround, R surround, LFE)

Support for optional double rate sampling (n+1 sample for PCM L, R & C)

Support for 18 and 20 bit sample lengths

Support for AC'97 soft modem features

AC'97 Overview

The AC'97 interface communicates with an AC'97/AMC'97 codec via a digital serial link, "AC-link." All digital audio streams, modem line Codec streams, and command/status information are communicated over this point-to-point serial interconnect. The AC'97 modem controller is a separate PCI function. However, the AC'97 modem controller is implemented in the same logical unit as the AC'97 audio functions.

System Initialization

The AC'97 circuitry is reset on power up by combining the ~PCIRST signal with the AC'97~AC_RST signal. The AC_RST signal remains asserted (low) until the driver writes the cold reset bit in the Global Control Register to 1 (either the audio or the modem driver can do this, because setting this bit in any one register will suffice since they both reflect the same register). During operation, the system can be reset by clearing the AC'97~AC_RST bit in the Global Control/Status Register (NABMBAR+60h). After Reset, a read to Mixer Register 00h indicates what type of hardware resides in the codec. If the codec is not present, i.e., AC'97 is not supported, codec ready is never seen by the controller.

Clocking

The AC'97 codec derives its clock internally from an externally attached 24.576 MHz crystal, and drives a buffered and divided down (½) clock to its digital companion controller over AC-link under the signal name "BIT_CLK". Clock jitter at the DACs and ADCs is a fundamental impediment to high quality output, and the internally generated clock provides AC'97 with a clean clock that is independent of the physical proximity of AC'97's companion digital controller (henceforth referred to as the "AC'97 controller"). The secondary codec is clocked by the BIT_CLK supplied by the primary codec.

The beginning of all audio sample packets, or "Audio Frames", transferred over AC-link is synchronized to the rising edge of the "SYNC" signal. SYNC is driven by BlueBirdVL. BlueBirdVL takes BIT_CLK as an input and generates SYNC by dividing BIT_CLK by 256 and applying some conditioning to tailor its duty cycle. This yields a 48 KHz SYNC signal whose period defines an audio frame. Data is transitioned on AC-link on every rising edge of BIT_CLK, and subsequently sampled on the receiving side of AC-link on each immediately following falling edge of BIT_CLK Digital Interface Primary Codec The Primary device is completely backwards compatible with existing AC'97 solutions. It generates the master BIT_CLK for both the controller and the secondary codec. Its registers are located in the same place as defined in AC'97.

AC-link Digital Serial Interface Protocol

Each AC'97 codec incorporates a five-pin digital serial interface that links it to the AC'97 controller. AC-link is a bi-directional, fixed rate, serial PCM digital stream. It handles multiple input and output audio streams, as well as Control Register accesses employing a time division multiplexed (TDM) scheme. The AC-link architecture divides each audio frame into 12 outgoing and 12 incoming data streams, each with 20-bit sample resolution.

The AC'97 controller signals the synchronization of all AC-link transactions. The primary codec drives the serial bit clock onto AC-link, which the AC'97 controller then qualifies with a synchronization signal to construct audio frames.

SYNC, fixed at 48 KHz, is derived by dividing down the serial bit clock (BIT_CLK). BIT_CLK, fixed at 2.288 MHz, provides the necessary clocking granularity to support 12, 20-bit outgoing and incoming time slots. AC-link serial data is transitioned on each rising edge of BIT_CLK. The receiver of AC-link data, AC'97 for outgoing data and AC'97 controller for incoming data, samples each serial bit on the falling edges of BIT_CLK.

The AC-link protocol provides for a special 16-bit time slot (Slot 0) wherein each bit conveys a valid tag for its corresponding time slot within the current audio frame. A "1", in a given bit position of Slot 0 indicates that the corresponding time slot within the current audio frame has been assigned to a data stream, and contains valid data. If a slot is "tagged" invalid, it is the responsibility of the source of the data, (AC'97 for the input stream and AC'97 controller for the output stream), to stuff all bit positions with 0's during that slot's active time.

SYNC remains high for a total duration of 16BIT_CLKs at the beginning of each audio frame. The portion of the audio frame where SYNC is high is defined as the "Tag Phase". The remainder of the audio frame where SYNC is low is defined as the "Data Phase".

Attached hereto as Exhibits 1 is a copy of the provisional application upon which this application relies for priority. This exhibit is incorporated herein by reference.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks may be integrated into components, or may be subdivided into components. Similarly, the blocks may represent portions of a method which, in some embodiments, may be reordered or may be organized in parallel rather than in a linear or step-wise fashion. The present specification and figures are accordingly to be regarded as illustrative rather than restrictive.

What is claimed is:

1. An apparatus comprising:
    a micro-controller core;
    a logic core coupled to the micro-controller core, the logic core to receive and send signals to and from a system interface responsive to the micro-controller core, the logic core to disable sending signals to the system interface responsive to the micro-controller core, wherein the system interface includes an interface to a computer;
    a controller core coupled to the micro-controller core, the ME controller core to receive and send signals directly to and from a CD (compact disc) drive interface allowing an access to a file system on a CD independently from a computer when the computer is in any one of a power off mode, a sleep mode, and a suspend mode, the controller core to disable sending signals to the CD drive interface when the computer is in a Dower on mode, wherein the ME controller core is controlled by the micro-controller core;
    a pass gate module, the pass gate module coupled to the system interface and to the CD drive interface, the pass gate module also coupled to the micro-controller core, the pass gate module to pass signals between the system interface and the CD drive interface responsive to the micro-controller core, allowing the computer to control an access to the CD when the computer is in the power on mode, the pass-gate module responsive to any one of a signal mode select and the micro-controller core.

2. The apparatus of claim 1 wherein the micro-controller core is an 8051 core.

3. The apparatus of claim 1 wherein pass gate module comprising an NMOS transistor and a PMOS transistor, wherein the micro-controller core is coupled to the pass gate module through a gate of the NMOS transistor and a gate of the PMOS transistor.

4. The apparatus of claim 3 wherein the logic core is coupled to the system interface through a first and second buffer, the first buffer having an output connected to the logic core and an input connected to the system interface, the second buffer having an input connected to the logic core and a tri-state output connected to the system interface, the tri-state output operational responsive to the logic core.

5. The apparatus of claim 4 wherein the controller core is coupled to the interface through a third and fourth buffer, the third buffer having an output connected to the controller core and an input connected to the CD drive interface, the fourth buffer having an input connected to the controller core and a tri-state output connected to the CD drive interface, the tri-state output operational responsive to the controller core.

6. The apparatus of claim 1 wherein the system interface is a multi-bit interface, and the controller interface is a multi-bit interface.

7. The apparatus of claim 6 wherein the pass gate module is includes a set of pass-gates, the set of pass-gates having one pass-gate for each bit of the multi-bit interface of the system interface, one pass-gate comprising an NMOS transistor and a PMOS transistor, the micro-controller core is coupled to the pass gate module through a gate of the NMOS transistor and a gate of the PMOS transistor.

8. The apparatus of claim 1 further comprising an on-chip DSP coupled to the micro-controller to decode audio files.

9. The apparatus of claim 8 further comprising a Smart Media interface coupled to the micro-controller to connect to one or more of a Smart Media card and a flash memory.

10. The apparatus of claim 9 further comprising a CODEC interface to output audio signals decoded by the DSP to any one of an earphone jack and a lineout jack.

11. An apparatus comprising:
a micro-controller;
a CAROM controller coupled to the micro-controller and to a CD drive interface to directly access a file system in a CD-ROM and read files while a computer is in any one of a sleep mode, power off mode, and suspend mode;
a bypass circuit coupled to the CD drive interface and to a computer interface allowing the computer to control and access the CD-ROM when the computer is in power on mode; and
a reprogrammable on-chip DSP coupled to the micro-controller to decode and process audio files from the CD-ROM independently from the computer, wherein the micro-controller controls the access to the CD-ROM and performs user interface functions.

12. The apparatus of claim 11, wherein the CD-ROM controller allows writing of files into the CD-ROM independently from the computer.

13. The apparatus of claim 12, wherein the CD-ROM controller is coupled to a keypad to control the CD-ROM in response to signals from the keypad independent from the computer.

14. The apparatus of claim 13 wherein the CD-ROM controller allows access to a file system in CD-ROM while a computer is disconnected.

15. The apparatus of claim 14 wherein the file system in the CD-ROM includes MP3 files.

* * * * *